United States Patent

Maure

[15] 3,680,080

[45] July 25, 1972

[54] OPTICAL LOGIC FUNCTION GENERATOR

[72] Inventor: Douglas Raymond Maure, Santa Ana, Calif.

[73] Assignee: Optical Memory Systems, Inc., Santa Ana, Calif.

[22] Filed: June 29, 1970

[21] Appl. No.: 50,551

[52] U.S. Cl...................340/347 DD, 235/152, 235/61.11 E, 250/213 A

[51] Int. Cl...........................................................G06f 7/00

[58] Field of Search..................235/61.11 E, 175, 152, 197, 235/198; 250/213, 213 A; 340/173, 347 DD

[56] References Cited

UNITED STATES PATENTS

| | | | |
|---|---|---|---|
| 3,046,540 | 7/1962 | Litz et al. | 250/213 A |
| 3,161,867 | 12/1964 | Isborn | 250/213 A |
| 3,270,187 | 8/1966 | Fomenko | 235/175 |

*Primary Examiner*—Thomas A. Robinson
*Attorney*—Jackson & Jones

[57] ABSTRACT

An optical logic function generator, capable of generating a vast number of logical functions, is disclosed. The optical generator comprises a housing for an array of light sensing elements, an array of light emitting elements and an optical mask positioned therebetween. Given m sensors and n emitters, mn portions of a mask are positioned in mn light transmission paths between the sensors and the emitters. The mask portions may either pass or block light, depending on the binary function desired. More than one emitter may be energized simultaneously. At least a pair of sensors are connected in a series electrical circuit between a point of reference potential and an output terminal. Interchangeable masks and selectively operable input and output circuitry provide the capability of performing computer operations with the optical logic disclosed by this invention.

34 Claims, 4 Drawing Figures

INVENTOR.
DOUGLAS RAYMOND MAURE
BY
Jackson & Jones
ATTORNEYS

PATENTED JUL 25 1972 3,680,080

OPTICAL LOGIC FUNCTION GENERATOR

BACKGROUND OF THE INVENTION

1. Field of the Invention

The field of this invention relates broadly to logic circuits, and more specifically to optical logic circuits.

2. Description of the Prior Art

Integrated circuit manufacturers have provided many individual logic circuits. These logic circuits each perform a given logical function and are assigned terminology indicative of the logical function which they perform. Typical examples are AND gates, NAND gates, OR gates, NOR gates, etc. In general, the devices available to the prior art are two input devices as opposed to three or more input devices. A very limited number of such plural input devices are available, as off-the-shelf items. Generally speaking, however, such plural input devices are normally provided by utilizing a plurality of two input devices interconnected with each other in accordance with a circuit designer's wiring plan.

For example, a computer designer, for any given series of arithmetic functions to be performed by a computer, first selects various logic devices available on the market. He designs and connects the various devices one to the other so as to perform his desired arithmetic operation. Ultimately a complete computing device has a large number of inputs and a large number of outputs with considerable complexity of numerous logic devices interconnected with each other to perform the desired computing operations.

Universal logic circuits, i.e. those capable of performing any desired arithmetic function have not heretofore been known to the prior art. Circuit designers, although they have dreamed of such devices, have not, prior to the advent of this invention, been provided with truly universal logic capability in a commercially feasible and highly practical device.

SUMMARY OF THE INVENTION

The foregoing disadvantages of the prior art are obviated in accordance with the principles of this invention in that a universal optical logic circuit is provided. The logic of this invention provides any desired number of inputs and outputs to perform any selected logic function. It comprises, in a housing, an array of light emitting elements and an array of light sensing elements having selectively interchangeable masks positioned therebetween. At least a pair of light sensors are connected in series with each other between a common potential point and an output terminal. Between the emitters and sensors are mn light transmission paths where m is the number of emitters and n is the number of sensors. Portions of the interchangeable masks positioned in these transmission paths are selectively made opaque or transmissible depending upon the logical function desired for the output terminal. Additional flexibility is provided by employing selectively operable input circuitry to disable selected light-emitting diodes. An inverter connected in series with a standard output amplifier yields either positive or negative logic functions as desired.

Figures 1, 2:
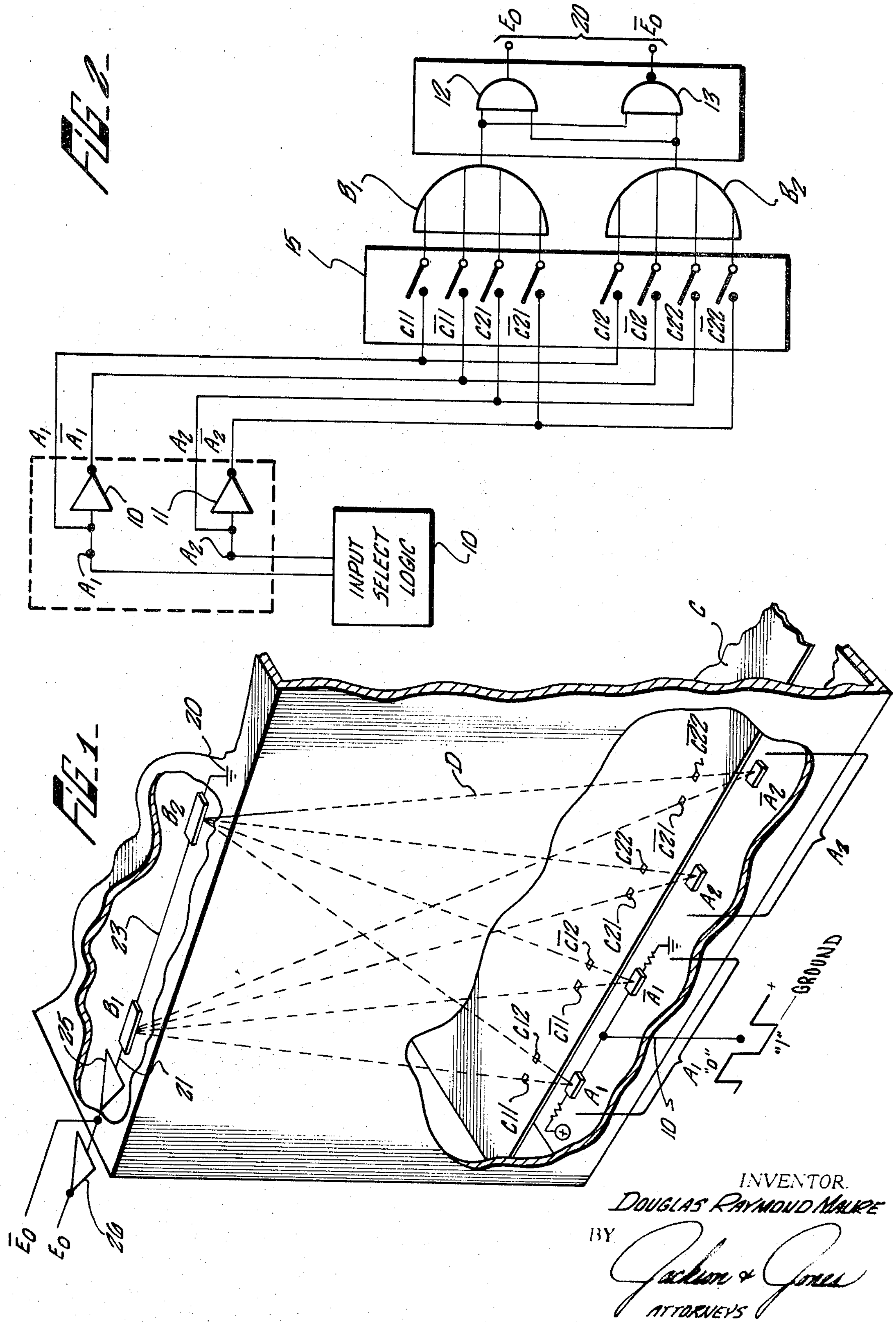
FIG. 1 is a perspective view of a universal optical logic circuit in accordance with the principles of the present invention.
FIG. 2 is a schematic logic circuit useful in explaining FIG. 1.

DESCRIPTION OF THE PREFERRED EMBODIMENT:

FIG. 1 depicts an optically light-tight housing 25, broken in section for clarity. It should be understood that the inner surfaces of housing 25 are made non-reflective. The housing may be of any convenient shape, such as cylindrical, to facilitate an optically tight configuration.

According to the basic premise of this invention, every light emitter is provided with a light path to every one of a plurality of light sensors. This basic configuration is shown in a previous application entitled "Read Only Memory," having Ser. No. 830,594, filed June 5, 1969, and by the same inventor to the same assignee as the present invention. Reference may be made to that application for certain housing, mask, and input/output circuitry requirements, if desired. It should further be understood that various lens systems may be employed to assure light paths between each and every emitter and each and every sensor. Such a lens system is described and claimed in an application entitled "Optical Apparatus," having Ser. No. 50,367 filed concurrently herewith and assigned to the same assignee as the present invention.

In FIG. 1 the lens system is omitted and only a minimum amount of structure pertinent to a clear understanding of this invention is disclosed for purposes of clarity. As shown in FIG. 1, two pairs of emitters are depicted. One pair is identified as $A_1$ and the other pair is identified as $A_2$. A pair of sensors $B_1$ and $B_2$ are electrically connected in an electrical series circuit between a point of common potential 20 (ground) and an output terminal 21 of sensor $B_1$. An optical mask C intercepts the light paths D between the sensors and the emitters. The emitters may preferably be photoemissive diodes fabricated from a photoemissive material such as gallium arsenide or gallium phosphide. Gallium arsenide diodes are particularly suited for this system, because such diodes emit light within one nanosecond of the application of an emission voltage applied thereto. The nature of the emitting sources, however, may be chosen according to particular system requirements. The detectors may be any suitable photo-sensitive device. For example, silicone and germanium pin diodes are well suited since they emit a detectable current within one nanosecond when light strikes the receiving surface. Other sensor devices such as MOS-FET transistors, of course, may be employed. Such devices exhibit a change in resistive value when light strikes the receiving surface. Such emitting and sensing devices are also being suggested for large-scale integrated chips and are within the concepts of this invention.

Regardless of the type of sensor employed, it should be understood that it has two separate states that may be detected by output circuitry such as the amplifiers 25 and 26 shown in FIG. 1. In one state (without light impinging on the sensor) the sensor's output level is in a first condition. In a second state (with light impinging on the sensor), the sensor's output level represents a second distinct condition.

For ease of understanding, assume that any light impinging on a sensor reduces the sensor's resistance to an extremely low level such as that of a short circuit. Taking a simplest case, assume that emitter $A_1$ is emitting light and that the areas C11 and C12 of mask C pass the light to both sensors $B_1$ and $B_2$. Sensors $B_1$ and $B_2$ change to their second or low impedance states and potential 20 is presented at output 21. This simple case represents an AND logic function because light must shine from $A_1$ to $B_1$ and from $A_1$ to $B_2$. With this background information in mind, the more complex and sophisticated logic functions of my invention may now be examined by further reference to FIG. 1.

Each given pair of emitters, such as $A_1$, are defined by conventional logical symbology. Thus $\overline{A_1}$ constitutes a binary zero, whereas $A_1$ constitutes a binary one. In accordance with the principles of this invention either one of the two binary inputs are present when a diode emitter emits light. Thus if a binary zero is applied to diode pair $A_1$, then emitter $\overline{A_1}$ emits light, and $A_1$ is dark. Conversely, if a binary one is applied to diode pair $A_1$, then $A_1$ emits light and $\overline{A_1}$ is dark.

The binary mask C is assigned portions to intercept the light transmission paths D. Eight transmission paths D exist between the emitters and sensors. The mask points at which these paths intercept the mask may either be opaque or transmissible. For purposes of explanation, the path intercept locations are given designations based on their association with a particular emitter and a particular sensor. Thus, reading from left to right, the path intercepts on mask C are designated C11, C12, $\overline{C11}$, $\overline{C12}$, C21, C22, $\overline{C21}$, $\overline{C22}$.

Various logic circuits can be selectively provided by simultaneously turning on one emitter each from each of the pairs, and by selectively placing opaque or transmissible portions at the light path intercepts of mask C, as will be more fully described hereinafter. In order to assist in understanding the concept of this invention, conventional logic symbols have been depicted in FIG. 2 wherein like elements of FIG. 1 and FIG. 2 are designated by the same numbers.

Comparing FIG. 1 with FIG. 2 the light emitter pair $A_1$ is shown as input $A_1$ of FIG. 2, whereas light emitter pair $A_2$ of FIG. 1 is shown as input terminal $A_2$ of FIG. 2. Detectors $B_1$ and $B_2$ of FIG. 1 are connected in series between ground and an output amplifier 25. The series connection 23 between detectors $B_1$ and $B_2$ amounts to the electrical equivalent of an AND gate 12 of FIG. 2. The output from amplifier 25, FIG. 1, is inverted by an inverter 26. The electrical equivalent of inverter 26 is performed by NAND gate 13 of FIG. 2. In FIG. 1 all of the emitters are provided with individual light paths to each detector. Detectors $B_1$ and $B_2$ thus act as OR gates and are so shown in FIG. 2. Mask C of FIG. 1 provides opaque or transmissible portions in any given one of the light paths D. The masks C are interchangeable, or the various portions at the light path intercepts may be selectively made either opaque or transmissible by any well-known technique. In either event the light from an emitter may be blocked or transmitted depending upon the physical condition of the mask portions. Such portions are depicted as the mechanical switch counterparts bearing the same letter designations in the switch bank 15 of FIG. 2 as they bear in FIG. 1. In FIG. 2 an open switch corresponds to an opaque portion and a closed switch corresponds to a transmissible portion.

FIG. 2 is a simplified yet universal logic function generator, which requires manual closure of switches within a switch bank 15. A circuit designer may close selective ones of the switches of switch bank 15, and obtain at the output terminals 20 any desired logic function of sixteen possible logic functions available from a two-terminal four-state input device. Table A depicts all four possible input states, and all sixteen possible output states for the two-terminal input and two-terminal output logic circuit of FIG. 2. Certain ones of the sixteen possible output state combinations are considered of lesser significance to circuit designers. These logic functions will be discussed following a discussion of several of the most significant logic functions generated by the circuit of FIG. 2.

In a similar manner for OR gate $B_2$ the following equation may be written:

$$(2)\qquad A_1.C12+\overline{A_1.C12}+A_2.C22+\overline{A_2.C22})$$

Since the outputs of both OR gates $B_1$ and $B_2$ are inputs to AND gate 12 an output will be yielded from gate 12 in accordance with the following Equation (3):

$$(3)\qquad (A_1.C11+\overline{A_1.C11}+A_2.C21+\overline{A_2.C21})$$
$$(A_1.C12+\overline{A_1.C12}+A_2.C22+\overline{A_2.C22})$$

Having developed the general solution for the output conditions from AND gate 12 as stated in Equation (3), certain switches may be selectively opened or closed to obtain a desired logic function. As a simple example, reference is made to output combination $OT_7$ of Table A. For the four possible input states of $A_1$ and $A_2$, output ones are yielded only when a one is present at $A_1$ or a one is present at $A_2$ exclusively. This logic configuration is termed an exclusive OR. Assume switches C11, $\overline{C12}$, C21 and $\overline{C22}$ only are closed. The terms of Equation (3) associated with closed switches are valid whereas the terms of Equation (3) associated with open switches drop out of the Equation. Equation (3) thus becomes:

$$(4)\qquad (A_1+A_2).(\overline{A_1}+\overline{A_2})$$

Equation (4) is the logic equation for an exclusive OR. Stated in words, when a one is present at $A_1$ ($A_1$) and a zero is present at $A_2$, ($\overline{A_2}$) then gate 12 yields a one output; and when a one is present at $A_2$ ($A_2$) and a zero is present at $A_1$, ($\overline{A_1}$) then gate 12 also yields a one output signal. For all other possible input conditions gate 12 emits zero output signals.

Certain designers prefer to deal in negative logic. NAND gate 13 of FIG. 2 receives the same input conditions as does AND gate 12. The operation of NAND gate 13 serves to invert the output conditions discussed above. Accordingly NAND gate 13 performs an exclusive NOR function which function is shown at output combination $OT_{10}$ in Table A.

Other selective switch combinations are available to perform the remaining logic functions of Table A. For example, an OR function, $OT_{15}$, Table A, may be supplied by closing switches C11, C21, C22, and $\overline{C22}$. The NOR function, $OT_2$, Table A, is the inverse available at the output of NAND gate 13. An AND function, $OT_9$, Table A, may be supplied by closing switches C11 and C22. The NAND function, $OT_8$, Table A, is again the inverse available at the output of NAND gate 13.

TABLE A

| Input | | Output combinations | | | | | | | | | | | | | | | |
|---|---|---|---|---|---|---|---|---|---|---|---|---|---|---|---|---|---|
| $A_2$ | $A_1$ | $OT_1$ | $OT_2$ | $OT_3$ | $OT_4$ | $OT_5$ | $OT_6$ | $OT_7$ | $OT_8$ | $OT_9$ | $OT_{10}$ | $OT_{11}$ | $OT_{12}$ | $OT_{13}$ | $OT_{14}$ | $OT_{15}$ | $OT_{16}$ |
| 0 | 0 | 0 | 1 | 0 | 1 | 0 | 1 | 0 | 1 | 0 | 1 | 0 | 1 | 0 | 1 | 0 | 1 |
| 0 | 1 | 0 | 0 | 1 | 1 | 0 | 0 | 1 | 1 | 0 | 0 | 1 | 1 | 0 | 0 | 1 | 1 |
| 1 | 0 | 0 | 0 | 0 | 0 | 1 | 1 | 1 | 1 | 0 | 0 | 0 | 0 | 1 | 1 | 1 | 1 |
| 1 | 1 | 0 | 0 | 0 | 0 | 0 | 0 | 0 | 0 | 1 | 1 | 1 | 1 | 1 | 1 | 1 | 1 |

As stated hereinbefore the optical logic function generator of FIG. 1 and the circuit of FIG. 2 correspond to each other. Accordingly the same basic equations may be written for the operation of both. In FIG. 2 assume a high level is a binary one and it is a true input. Further assume that a low level is a binary zero or a false input. True inputs applied by input select logic 10 to input terminals $A_1$ and $A_2$ are inverted to false, or zero, levels by inverters 10 and 11, whereas false, or zero, inputs are inverted to true, or one, levels by inverters 10 and 11. Assume all switches of bank 15 are closed. Under the assumed conditions certain equations may be written using conventional logic symbols. Thus a plus (+) is an OR term. A dot (.) is an AND term. A bar over a symbol is a zero or false state. The absence of a bar is a true or one state. Considering both possible inputs at $A_1$ and $A_2$ the following equation may be written for OR gate $B_1$:

$$(1)\qquad (A_1.C11+\overline{A_1.C11}+A_2.C21+\overline{A_2.C21})$$

The above-described examples yielded positive logic functions for AND gate 12 and negative logic functions for NAND gate 13. It should be understood that other switch closure combinations can yield positive logic functions for NAND gate 13 and negative logic functions for AND gate 12. To give just one example, closure of switches C11, $\overline{C12}$, $\overline{C21}$ and C22 provide an exclusive NOR at AND gate 12, whereas the inverse from NAND gate 13 is an exclusive OR function. It is thus apparent that the description pertaining to designated switch closures thus far is only to be taken as illustrative of the principles of this invention and is not to be taken as limiting.

Certain of the output combinations of Table A are considered to be of lesser importance to designers than those just described. Such combinations are designated as such because they can be implemented with a single logic element or without any logic elements at all. These combinations include:

$OT_1$ which is an open circuit; $OT_4$ which is an inverter for $A_2$; $OT_6$ which is an inverter for $\overline{A_1}$; $OT_{11}$ which signifies that ones are applied to $A_1$ only and are not applied to $A_2$; $OT_{13}$ which signifies that ones are applied to $A_2$ only and not to $A_1$; and $OT_{16}$ which is a short circuit. The remaining output combinations of Table A represent useful logic functions which have not as yet been implemented in off-the-shelf hardware and are not designated by conventional terminology. The versatility of this invention is readily shown by considering output combination $OT_3$ which has the logic equation $A_1.\overline{A_2}$. This logic function is thus an AND gate which emits a one when a one signal is present on lead $A_1$ and a zero is present on $A_2$. Stated another way, the $A_2$ lead is inverted. Normally a designer would utilize two components, namely an inverter and an AND gate to achieve this logic function. $OT_5$ is the inverse of this logic function in that its equation is $\overline{A_1}.A_2$. Again a plurality of components are normally put together in hybrid form to achieve this logic function. Such a hybrid would involve an inverter for the $A_1$ lead and an AND gate connected to receive the inverted output as one input and lead $A_2$ as the second input. Output combinations $OT_{12}$ and $OT_{14}$ are also readily available without requiring a hybrid combination by a circuit designer. The logic equation for $OT_{12}$ is $A_1+\overline{A_2}$. Such a logic function would normally involve an inverter connected between an input lead $A_2$ and an OR gate which has as its other input lead $A_1$. $OT_{15}$ similarly is the inverse of the above having a logical equation of $\overline{A_1}+A_2$.

Each of the switch closure examples given hereinbefore demonstrate the versatility that is available from two emitter pairs and two sensors connected in series. Each different switch closure combination represents a different mask configuration for the embodiment of FIG. 1. Accordingly logic functions may be altered simply by interchanging masks with different opaque and transmissible areas C11 through $\overline{C22}$ selectively provided. I have built an optical unit which includes one thousand light emitters that are optically coupled to one hundred sensors. Such a unit provides one hundred thousand bit positions on the mask, which bit positions may be opaque or transmissible. Various pairs of sensors and associated emitters may be selected so that all of the useful logic functions discussed above may be present with one mask, thus obviating the requirement for different masks and at the same time yielding all of the logic functions discussed.

Whereas the invention has been described in its simplest terms in the form of a two-input/two-output device, its significant advance in the art is not limited to such a configuration. Indeed the extreme simplicity of applicant's approach permits plural input/plural output devices capable of readily performing more complex logic functions in a simple and precise manner. For example, assume that three pairs of input diodes are employed. If there are n inputs there are $2^{2^n}$ possible logical functions that can be generated. With three inputs there are eight possible input states and $2^8$ or 256 possible output combinations. Only a few three input logic devices have been implemented as off-the-shelf items. The more conventional of these is the sum output and the carry output both of which are extensively used in digital processing for binary addition.

In order to demonstrate the enormous capability of this optical logic device, a sixteen bit arithmetic unit is described in connection with FIG. 3.

Figures 3, 4:
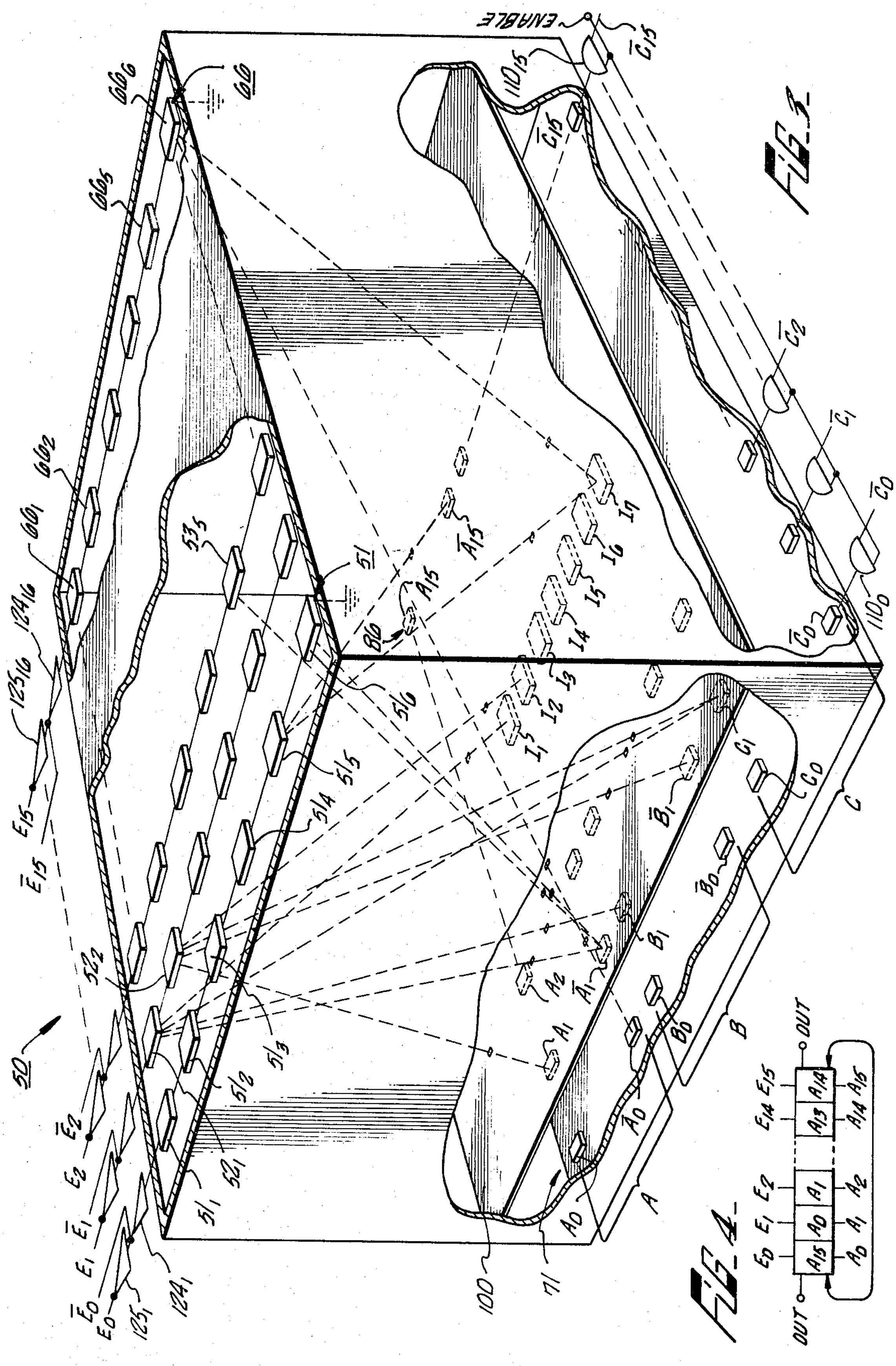
FIG. 3 is a perspective view of an optical arithmetic unit.
FIG. 4 is a binary flow chart useful in explaining certain arithmetic operations in conjunction with FIG. 3.

In FIG. 3 a sixteen bit arithmetic unit 50 includes six sensors $51_1$ through $51_6$ connected in series between ground and an input to an amplifier $124_1$ to form a front row 51. 16 rows, 51 through 66, are provided with each row being associated with a bit position starting with the least significant bit in the front row 51 and ending with the most significant bit in the back row 66. Sixteen separate amplifier combinations $124_1$, $125_1$ through $124_{16}$, $125_{16}$, serve to connect the sixteen rows of series sensors to output terminals, labelled $E_0$ through $E_{15}$. A sixteen bit binary output word is thus presented in parallel at output terminals $E_0$ through $E_{15}$.

Three pairs of emitter diodes, designated as A, B and C emit light to all sensors. Six diodes (three diode pairs A, B and C) are placed in each diode row 71 through 86. The diode pairs in the front row 71 represent the least significant bit position for three different input bit terms, $A_0$, $B_0$ and $C_0$. The diode pairs in the back row 86 represent the most significant bit position for input bit terms, $A_{15}$, $B_{15}$ and $C_{15}$.

In the manner described hereinbefore with reference to FIG. 1, one diode of each pair emits light for a binary one and the other diode of that pair emits light for a binary zero. A bar over a symbol, in conventional logic terminology, is a zero or a false state. The absence of a bar is a true or one state.

Thus in row 71, if diode $A_0$ is on, through any conventional input circuitry, not shown, then the least significant input bit of the A term $A_0$ is a one. On the other hand, if diode $\overline{A_0}$ is on, then the least significant input bit of the term $A_0$ is a one. On the other hand, if diode $A_0$ is on, then the least significant input bit of the A term $A_0$ is a zero. In a similar manner, sixteen bit words of random bit combinations may be supplied at input pairs $A_0$, $\overline{A_0}$ through $A_{15}$, $\overline{A_{15}}$ and pairs $B_0$, $\overline{B_0}$ through $B_{15}$, $\overline{B_{15}}$ and pairs $C_0$, $\overline{C_0}$ through $C_{15}$, $\overline{C_{15}}$.

In addition to the rows of light emitting and light sensing devices just described for FIG. 3, seven control diodes $I_1$ through $I_7$ are depicted beneath mask 100. Control diodes $I_1$ through $I_6$ each emit light to one column of sensors only. The first column of sensors $51_1$ through $66_1$ is controlled by control diode $I_1$. The other columns of sensors from left to right are controlled respectively by control diodes $I_2$ through $I_6$. Control diode $I_7$ is a special-purpose control diode which is utilized in shifting particular bits "around or out" during arithmetic operations. The operation involving control diode $I_7$ will be described in more detail hereinafter.

As is well-known, one primary operating component of an arithmetic unit is an adder circuit. In addition to the adder circuit, components for shifting, complementing and transferring the binary bit inputs must be present in an arithmetic unit. These operations are simply and easily performed by the optical arithmetic unit of my invention as will now be described. An output equation for any row *n* of sensors of FIG. 3 for the arithmetic unit there shown is defined as follows;

$$(5)\qquad \overline{E_n}=(A_n.\overline{B_n}.\overline{C_n}.I_1)+(\overline{A_n}.B_n.\overline{C_n}.I_2)+(A_n.B_n.C_n.I_3)+(\overline{A_n}.\overline{B_n}.C_n.I_4)+(A_{(n+1)}.B_{(n+1)}.I_5)+(A_{(n-1)}.B_{(n-1)}.I_6)$$

In order to be consistent with the previous description of FIGS. 1 and 2, Equation (5) will be rewritten in terms of the mask requirements as to dark and light areas. The mask requirements may be simply obtained by utilizing De Morgan's theorem for Equation (5). De Morgan's theorem allows Equation (5) to be rewritten as follows:

$$(6)\qquad E_n=(\overline{A_n}+B_n+C_n+\overline{I_1}).(A_n+\overline{B_n}+C_n+\overline{I_2}).(\overline{A_n}+\overline{B_n}+\overline{C_n}+\overline{I_3}).(A_n+B_n+\overline{C_n}+\overline{I_4}).(\overline{A}_{(n+1)}+\overline{B}_{(n+1)}+\overline{I_5}).(\overline{A}_{(n-1)}+\overline{B}_{(n-1)}+\overline{I_6})$$

In Equation (6) the subscript *n* is the particular binary bit under consideration as associated with a given row of sensors and light emitters. Each one of the six terms within parentheses in Equation (6) is associated with an individual sensor of the six sensors in the *n*th row. With reference to FIG. 3, assume that $n = 1$, i.e. the next to least significant bit. The terms within the first parentheses of Equation (6) define the light paths, i.e. transmissible areas, placed in the mask, so that each one of the emitters may shine on sensor $52_1$. Thus in mask 100 transmissible areas are provided from diode $\overline{A_1}$, diode $B_1$, diode $C_1$ and from the control diode $I_1$ to sensor $52_1$. Sensor $52_1$, as stated in Equation (6), is ANDed with sensor $52_2$, which sensor has light paths provided from diode $A_1$, $\overline{B_1}$, $C_1$ and from control diode $I_2$. In a similar manner, the remaining light paths for sensors $52_3$ and $52_4$ may be determined by the third and fourth parentheses terms of Equation (6).

In Equation (6) the first four terms represent an adder. A truth table for an adder is given in Table B:

TABLE B

| $CB_n$ (n–1) | $A_n$ | $S_n$ | $C_n$ |
|---|---|---|---|
| 00 | 0 | 0 | 0 |
| 00 | 1 | 1 | 0 |
| 01 | 0 | 1 | 0 |
| 01 | 1 | 0 | 1 |
| 10 | 0 | 1 | 0 |
| 10 | 1 | 0 | 1 |
| 11 | 0 | 0 | 1 |
| 11 | 1 | 1 | 1 |

In the truth table of Table B, binary bits A and b are summed together to yield a sum output S and a carry output C. The input column of Table B labelled $C_{(n-1)}$ is the carry from a previous stage. The truth table for the adder is well-known and need not be further discussed. Suffice it to say that the first four terms of Equation (6), operating with the emitter and sensor pairs, perform the sum and carry operation.

The control diodes play an important role in performing the sum and carry and other arithmetic operations. For example, at this point in the operation of the arithmetic unit of FIG. 3, the purpose of the control diodes $I_1$ through $I_6$ becomes apparent. Assume that when a control diode is on, its associated sensor corresponds to an open switch as described earlier with reference to FIG. 2. As therein described such an "on" or "open" condition removes the associated term from the equation of the output signal whereas those terms associated with "off" control diodes are valid terms for the equation. Stated another way, the mask represents a method of optically wiring a control diode to a column of assigned sensors. When it shines light on the sensors in its assigned column, it shorts the sensors out, thus connecting ground through the remaining operating sensors in the rows to their associated output amplifiers. In order, therefore, to perform a sum of A and B, (assuming that a carry is generated exterior to the circuit by conventional circuitry or by another optical universal logic element) it is essential that control diodes $I_5$ and $I_6$ be energized by input select circuitry of any well-known type. With control diodes $I_5$ and $I_6$ "on," their associated terms are removed from Equation (6), leaving only the first four terms as valid terms. Under such an assumption, the equation becomes the logic equation for an adder, as follows:

$$(7)\quad E_n=(\overline{A_n}+B_n+C_n+\overline{I_1}).(A_n+\overline{B_n}+C_n+\overline{I_2}).(\overline{A_n}+\overline{B_n}+\overline{C_n}+\overline{I_3}).(A_n+B_n+\overline{C_n}+\overline{I_4})$$

Arithmetic units are required to perform numerous operations in addition to sum and carry operations. The following operations are typical of those required by an arithmetic unit. The sum has just been described.

1. Sum
2. Exclusive OR
3. AND A . B
4. $\overline{A}$ . B
5. A . $\overline{B}$
6. A or B
7. A or $\overline{B}$
8. $\overline{A}$ or B
9. Shift forward A (around or out)
10. Shift backward A (around or out)
11. Shift forward B (around or out)
12. Shift backward B (around or out)
13. Compare A and B
14. Direct transfer A
15. One's complement A
16. Direct transfer B
17. One's complement B Additional flexibility for the arithmetic unit of FIG. 3 is provided by assigning a plurality of control gates to each column of the input diode pairs. FIG. 3 depicts a typical plurality of such input gates $110_0$ through $110_{15}$ for diode pairs $\overline{C_0}$ through $C_{15}$. As shown in FIG. 3, one enable lead is common to all sixteen AND gates, if an enable signal is selectively removed from the enable lead, then even though a light emitting command signal is present for a diode such as $\overline{C_0}$, the signal does not get through the disabled AND gate $110_0$ to emitter diode $\overline{C_0}$. Diode $\overline{C_0}$ remains off. Thus by further controlling light emitting states for those diodes associated with given binary words, individual components of the terms may be effectively removed from either Equation (6) or Equation (7).

Looking at Equation (7), assume for example, that control diodes $I_3$ and $I_4$ are "on," along with control diodes $I_5$ and $I_6$ which are also "on," as discussed previously. Also assume that the column of emitter diodes $\overline{C_0}$ through $\overline{C_{15}}$ have the enabling signal removed from AND gates $110_0$ through $110_{15}$. The $\overline{C}$ component is thus effectively removed from the third and fourth terms of Equation (7) and the third and fourth terms are removed entirely. The output function then simply becomes $(\overline{A_2}+B_2)$ . $(A_2+\overline{B_2})$ which, as discussed hereinbefore, is the logic equation for an exclusive OR. An exclusive OR is another basic operation that must be performed by an arithmetic unit. As described earlier, the NOT term is an exclusive NOR or a comparator which is one further essential operation for an arithmetic unit.

To carry the description a step further, assume that, in addition, the enabling signal is removed from the AND gates (not shown) for diodes $\overline{B_0}$ through $\overline{B_{15}}$ and diodes $A_0$ through $A_{15}$. Under this assumption the output equation is simply $\overline{A_2}+B_2$. This represents another vital operation to be performed by an arithmetic unit.

One of the operations required to be performed by an arithmetic unit is a shift operation. It is well-known that multiplication and division by an adder requires shifting at appropriate times. Thus it may be necessary to shift an entire sixteen bit word one or more places forward or one or more places backward. A shift forward by one bit position for the 16 bit binary input word A will now be described with reference to Equation (6) and FIG. 4.

As shown in FIG. 4, $A_{15}$, the most significant bit moves around into the least significant bit position. All other bits move forward one bit position. In order to a shift forward operation to take place, control diodes $I_1$, $I_2$, $I_3$, $I_4$ and $I_6$ must be placed in an "on" condition. Accordingly, the only term remaining in the output equation is $(\overline{A_{(n+1)}}+\overline{B_{(n+1)}}+\overline{I_5})$. Assume further for the shift forward operation that the enable signal is removed from the control logic gates for the column of light emitting diodes $\overline{B_0}$ through $\overline{B_{15}}$. This absence of an enabling signal for the $\overline{B}$ diodes also removes that term from the equation. The only remaining term is $A_n+_1$. Accordingly the binary word present at the A term is shifted forward one bit position. It is not necessary to fully complete in FIG. 3 all light paths involved for the forward and around shift in FIG. 4, since it is clear that if one bit of the A term is shifted forward then all of the bits for the sixteen bit input A word will be shifted forward. In FIG. 3 the subscript $_n$ is again assumed to be one, thus establishing a light path from diode $\overline{A_1}$ to sensor $53_5$. Sensor $53_5$ is connected in the series circuit between ground and output amplifiers $124_3$, $125_3$.

The output terminal for the third row 53 of sensors is $E_2$. The input term under consideration was, of course, $A_1$. Accordingly, the output signal $E_2$ relative to the input signal $A_1$ has been advanced forward by one binary position. Reference to FIG. 4 shows that the $A_1$ bit (previously located in the next to the least significant bit position) has moved forward one bit position. In FIG. 3 the light path from diode $\overline{A_{15}}$ is completed through mask 100 to sensor $51_5$. Sensor $51_5$ is connected to output terminal $E_0$. Accordingly the input term $A_{15}$ is moved into the first or $E_0$ position.

In certain instances it is imperative that either the most or the least significant bit be shifted out rather than shifted around. Shifting out is accomplished through the use of control diode $I_7$. Control diode $I_7$ is a special diode that is provided with light paths to two sensors $51_5$ and $66_6$ only. When it is required to shift the term $A_{15}$ out, FIG. 4, then control diode $I_7$ is turned "on." With control diode $I_7$ shorting out sensor $51_5$ then the $A_{15}$ term does not move into the position $E_0$ is it is lost or shifted out.

In a similar manner it is clear that a shift backward is accomplished by turning on control diodes $I_1$, $I_2$, $I_3$, $I_4$ and $I_5$ and disabling the enable signal for the logic gates associated with the diodes $\overline{B_0}$ through $\overline{B_{15}}$. Such an operation leaves the term $A_{(n-1)}$ valid and a backward shift via light path from $\overline{A_1}$ to sensor $51_6$ is accomplished. It is also apparent that if it is desired to shift the B term either forward or backward, then the enable signal for the logic gates associated with the diodes $\overline{A_0}$ through $\overline{A_{15}}$ would be disabled, together with the control diodes previously described. During a backward shift out the control diode $I_7$ is again turned "on" and the light path from $\overline{A_0}$ to sensor $66_6$ associated with output term $E_{15}$ is shorted out.

The remaining operations for the arithmetic unit are considered obvious from the description already given and need not be fully described in detail. Briefly for example, the one's complement of A is simply $\overline{A}$. Direct transfers may obviously be affected by controlling various terms of the basic equation of the arithmetic unit of FIG. 3.

The arithmetic unit just described is merely illustrative of one computer operation performable by a given mask, emitter and sensor configuration. Obviously numerous different logical operations may be performed by varying the number of sensors and emitters and/or by varying the mask configuration.

What is claimed is:

1. An optical logic element having a plurality of input means adapted to receive an input signal representative of at least one digit having assigned thereto first and second states indicative respectively of the presence or absence of that digit, said logic element comprising:

light emitting means responsive to an input signal for establishing a separate light beam for each state possible for the given digit of said input signal;

light sensing means spaced from the light emitting means and positioned to receive a light beam from every emitting means, said sensing means characterized as having two states with one state associated with the incidence of light thereon and the other state associated with the absence of light thereon, each state being representative of output signals capable of being detected at an output of said sensing means; and means passing and/or blocking selected light beams between the light emitting means and the sensing means for logically modifying the input signal to a different output signal at the output of said sensing means.

2. An optical logic element in accordance with claim 1 wherein:

said light emitting means comprises at least a pair of light emitters with one emitter assigned to emit light for one binary state of said input signal and the other emitter of said pair assigned to emit light for the other possible binary state of said input signal.

3. An optical logic element in accordance with claim 2 wherein:

said sensing means comprises a pair of sensors and means connecting them in a series electrical circuit between a point of common reference potential and said output of said sensing means.

4. An optical logic element in accordance with claim 1 wherein:

said interposed means comprises a mask having opaque or transmissible areas at the points of intersection of said light beams with said mask.

5. An optical logic element in accordance with claim 2 and further comprising:

a first plurality of said light emitter pairs with each pair assigned a digit position for each digit of a first multi-digit input signal.

6. An optical logic element in accordance with claim 5 and further comprising:

a second and third plurality of said light emitter pairs with each pair assigned a digit position for each digit of a second and third multi-digit input signal respectively.

7. An optical logic element in accordance with claim 6 wherein said interposed means logically performs arithmetic manipulations of said first, second and third input signals.

8. An optical logic element in accordance with claim 7 wherein:

said sensing means comprises a plurality of rows of light sensors, each row comprises at least a pair of sensors and means connecting them in a series electrical circuit between a point of common potential and said output of said sensing means.

9. An optical logic element in accordance with claim 8 wherein said sensing means further comprises:

a plurality of output terminals, one terminal each of said plurality connected in one series circuit each of said rows of sensor pairs, each of said output terminals being associated with one digit position of a multi-digit output signal.

10. An optical logic element in accordance with claim 9 and further comprising at least four sensors connected in series in each of said rows.

11. An optical logic element in accordance with claim 10 wherein each input means receives a binary input signal and further characterized in that each given output terminal, $E_n$, where $n$ is any given bit position, has an output signal equation:

$$\overline{E_n} = (A_n.\overline{B_n}.\overline{C_n}) + (\overline{A_n}.B_n.\overline{C_n}) + (A_n.B_n.C_n) + (\overline{A_n}.\overline{B_n}.C_n)$$

wherein A, B and C are the $n$th bit of said first, second and third binary input signals, and each term in parenthesis is associated with one each of said sensors in the $n$th row.

12. An optical logic element in accordance with claim 11 wherein said interposed means comprises:

a mask having light transmitting and light blocking areas at the intercepts of said light beams as defined by De Morgan's theorem of the output equation of claim 11.

13. An optical logic element in accordance with claim 10 and further comprising at least six sensors connected in series in each of said rows, and:

a plurality of control emitters each of which is associated with a given sensor only in all of said rows and is adapted to selectively emit light on said given sensors.

14. An optical logic element in accordance with claim 13 and further characterized in that each given output terminal, $E_n$, where $n$ is any given bit position has an output equation:

$$\overline{E_n} = (A_n.\overline{B_n}.\overline{C_n}.I_1) + (\overline{A_n}.B_n.\overline{C_n}.I_2) + (A_n.B_n.C_n.I_3) + (\overline{A_n}.\overline{B_n}.C_n.I_4) + (A_{(n+1)}.B_{(n+1)}.I_5) + (A_{(n-1)}.B_{(n-1)}.I_6)$$

wherein A, B and C are the $n$th bit of said first, second and third binary input signals in accordance with conventional logic terminology, each term in parenthesis is associated with one each of said sensors, and "I" is a control emitter associated with the sensor of the term in parenthesis.

15. An optical logic element in accordance with claim 14 and further characterized in that said interposed means comprises:

a mask having light transmitting and light blocking areas at the intercepts of said light beams as defined by De Morgan's theorem of the output equation of claim 14.

16. An optical logic element in accordance with claim 15 and further characterized in that:

light emitted from any given control emitter removes its associated term in parenthesis from the output equation.

17. An optical logic element in accordance with claim 14 and further comprising:

gating means for selectively disabling any given row of emitters from a row of emitter pairs.

18. An optical logic element in accordance with claim 17 wherein:

any disabled row of emitters removes the associated term from said output equation of claim 14.

19. An optical logic element in accordance with claim 18 and further comprising:

means emitting light from control emitters $I_1$, $I_2$, $I_3$, $I_4$, $I_6$ and the emitter pairs associated with the binary input term A or B to provide an arithmetic shift for the binary input term A or B.

20. An optical logic element in accordance with claim 19 wherein each binary input signal has a least and a most significant bit position, and further comprising:

an additional control emitter associated only with a sensor in each row identifying the least and most significant bit positions; and means selectively causing said additional emitter to emit light for shifting out either the least or the most significant bit of any given binary input signal.

21. An optical logic element in accordance with claim 3 wherein:

each of said sensing means assumes said second state upon incidence of a light beam from either one of said input means.

22. An optical logic element in accordance with claim 4 wherein:

each of said sensing means comprises a logical OR gate in response to any light beams from said plurality of input means.

23. An optical logic element in accordance with claim 5 wherein:

said connecting means comprises a logical AND gate for supplying an output signal for said sensing means only upon coincidence of light beams on both of said sensors.

24. An optical logic element in accordance with claim 2 and further comprising:

means for selectively energizing either one of said pair of light emitters.

25. An optical logic element in accordance with claim 2 and further comprising:

means for simultaneously energizing both emitters of said pair.

26. An optical logic element in accordance with claim 1 wherein said interposed means comprises:

an optical mask means having light transmissible or light blocking areas positioned at the interception points of said beams and said mask.

27. An optical logic element in accordance with claim 26 wherein:

said plurality of input means equals $n$, where $n$ is any whole number greater than one;

said sensing means comprises a plurality of light sensors equal to $m$, where $m$ is any whole number greater than one; and said mask means includes $mn$ areas.

28. An optical logic element in accordance with claim 26 wherein:

said mask means comprises a plurality of interchangeable masks each having different configurations of light transmissible and light blocking areas for performing selectively different logical modifications of said binary input signal.

29. An optical logic element located in a housing comprising:

at least one pair of light emitters with one emitter assigned one binary value when emitting light and the other emitter assigned the opposite binary value when emitting light;

at least a pair of light sensors spaced away from the emitter pair so as to define pairs of light paths between each emitter and said sensor pair;

means electrically connecting said sensors in series; and an optical mask between the emitter and sensor pairs having selected areas of the mask positioned to intercept the light paths and define logic functions for said element in accordance with selective opaque or transmissible areas at said path intercepts.

30. An optical logic element in accordance with claim 29 and further comprising:

a plurality of interchangeable masks each of which have different configurations of opaque or transmissible areas at said path intercepts for logically modifying the logic functions for said element.

31. A universal logic element comprising:

at least one pair of light emitters housed in an optical housing;

at least one pair of sensors spaced away from said emitter in said housing to define a pair of light paths from each emitter to both sensors;

means electrically connecting said sensors in a series circuit between a point of common reference potential and an output terminal; and a mask positioned between said emitters and said sensors having light transmissible areas at the points of intercept of said light paths for defining a logical OR function which applies said common potential to said output terminal when light shines on both sensors from either one of said pair of light emitters.

32. A universal logic element comprising:

at least one light emitter housed in a housing;

at least one pair of sensors spaced away from said emitter in said housing to define a pair of light paths with one each of said light paths from said emitter to one each of said sensors;

means electrically connecting said sensors in series between a point of common potential and an output terminal, and a mask positioned between the emitter and pair of sensors with light transmissible areas at the point of intercept of said light paths for defining a logical AND function which applies said common potential to said output terminal when light shines from said emitter on both of said sensors.

33. In an optical logic apparatus, the combination which comprises:

a plurality of spaced light emitters for emitting light when energized;

a plurality of spaced independent light sensors for providing output signals when illuminated with light so that the output signals from more than one sensor may be simultaneously detected;

an optical mask defining a plurality of discrete areas with each area uniquely associated with one emitter and one sensor and being either substantially opaque or transparent to include or exclude terms from a logic operation to be performed by said optical logic apparatus;

means for transmitting a beam of light from each of the emitters, when energized, to the areas of the mask associated with the energized emitter; and means selectively energizing at least two emitters simultaneously for defining certain terms in the logic operation to be performed by said optical logic apparatus.

34. An optical logic element having input means adapted to receive an input signal representative of a term present in a logic operation which term has assigned thereto first and second states indicative respectively of the presence or absence of that term, said logic element comprising:

a pair of light emitters assigned to each term of the logic operation;

means for establishing a separate light beam from one emitter of each pair for each of the two states possible for the given term received at its associated emitter pair;

light sensing means spaced from the light emitter means and positioned to receive a light beam from every emitter, said sensing means responsive to light thereon for assuming a different state than the sensing means possesses in the absence of light thereon, said sensing means operative in response to said light beams for emitting a predetermined logical output signal at an output term of said sensing means; and means passing and/or blocking selected light beams from the light emitters to the sensing means for including in the output signal from the sensing means only certain selected logically modified terms of said input signal.

* * * * *

UNITED STATES PATENT OFFICE
CERTIFICATE OF CORRECTION

Patent No. 3,680,080 Dated July 25, 1972

Inventor(s) Douglas Raymond Maure

It is certified that error appears in the above-identified patent and that said Letters Patent are hereby corrected as shown below:

Column 3, line 11, after "$A_1$" insert "of Figure 1"

Column 6, lines 13 and 14, delete "On the other hand, if diode $\overline{A}_0$ is on, then the least significant input bit of the term $A_0$ is a one."

line 15 "$A_0$" should be "$\overline{A}_0$"

Column 7, Table B should have five distinct columns, the first two have been put together.

line 19, "b" should be "B"

Signed and sealed this 6th day of February 1973.

(SEAL)
Attest:

EDWARD M.FLETCHER,JR.
Attesting Officer

ROBERT GOTTSCHALK
Commissioner of Patents